S. S. Bent.
Poultry Coop.
No. 88,118. Patented Mar. 23, 1869.

Witnesses:
W. H. Smith
Geo. J. Pinckney

Inventor:
Samuel S. Bent
per L. W. Serrell
Attorney

United States Patent Office.

SAMUEL S. BENT, OF PORT CHESTER, NEW YORK.

*Letters Patent No. 88,118, dated March 23, 1869; antedated March 22, 1869.*

IMPROVEMENT IN COOPS FOR POULTRY.

The Schedule referred to in these Letters Patent and making part of the same.

*To all whom it may concern:*

Be it known that I, SAMUEL S. BENT, of Port Chester, in the county of Westchester, and State of New York, have invented, made, and applied to use, a certain new and useful Improvement in Coops for Poultry; and I do hereby declare the following to be a full, clear, and exact description of the said invention, reference being had to the annexed drawing, making part of this specification, wherein—

Similar marks of reference denote the same parts.

Figure 1:
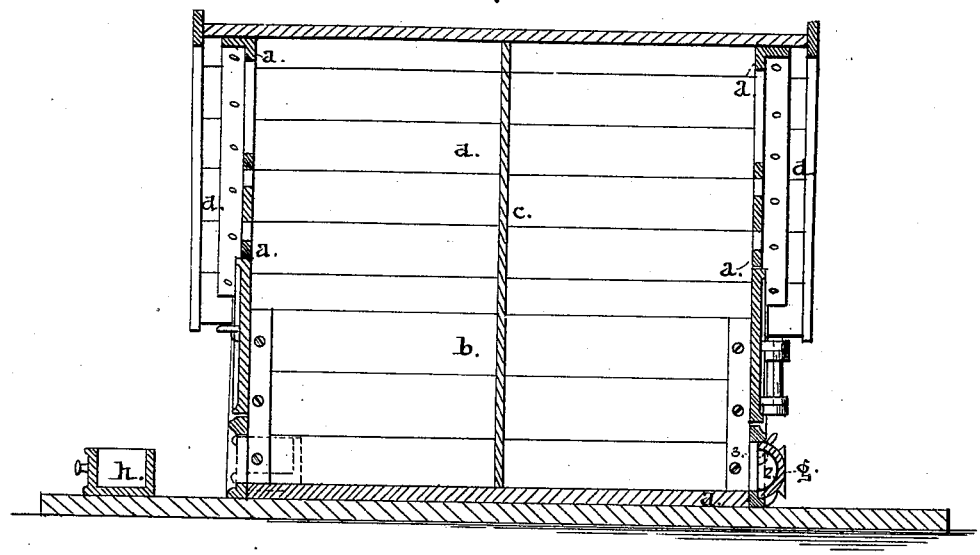
Figure 1 is a vertical section of said coop, with one side closed, and the other side open, for the chickens to pass in and out.

In Letters Patent granted to me, May 19, 1868, a chicken-coop is shown with a metallic open-work plate, with openings in the lower part for the chickens, that are closed by movable doors, or covers.

My present invention is an improvement upon or modification of the said invention, and consists in a feeding-trough and stopper, combined with said open-work metallic plate, whereby the feeding-trough itself can be employed for closing up the coop at night, and hence any food that may remain in the trough can be eaten by the chickens, instead of their being shut up, without opportunity to get out to their food.

In the drawing—

$a$ is the metallic open-work plate, for forming the end or side of the coop. I have shown the same at the ends of the coop.

$b\ b$ are the sides;

$d$, the roof; and $c$, a partition that may be used to divide the coop into two compartments.

The parts $b\ b$, $d$, and $c$, may be made of any suitable material.

The lower part of the plate $a$ is formed with an opening, or series of openings, of a size adapted to allow the chickens, or poultry to pass in and out, and this opening is closed at night by my combined feeding-trough, or stopper.

I have shown said feeding-trough and stopper in two forms, adapted to the different shapes of openings.

Figure 2:
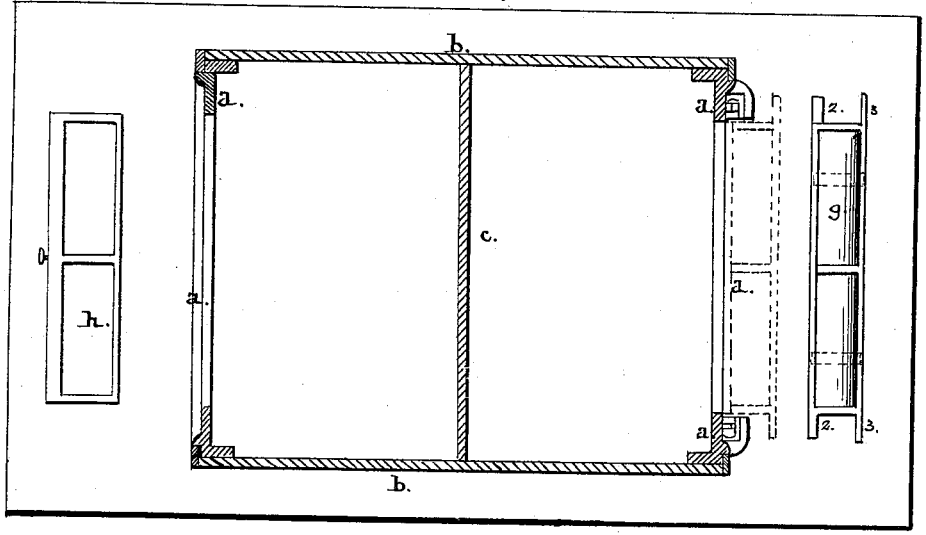
Figure 2 is a sectional plan, showing the feeding-troughs in position for use.

If a series of small openings is provided, I find it most convenient to make my feeding-trough, as shown at $g$, of a length corresponding to the openings to be covered, and of a width sufficient to cover their height; and at the ends, trunnions 2 2, or lugs, are provided, upon which the trough can turn when swung up against the openings, to close the same. In this case, latch-pieces 3 3 are employed to hold up the trough against the plate $a$, to act as a stopper, and the food that remains in the trough will either be tipped into the coop or remain in a position where it is easy of access to the chickens through the openings. This trough $g$ may be lifted away from the coop a little distance, as seen in fig. 2, or it may remain simply turned down, as shown by red lines.

The form of feeding-trough and stopper shown at $h$ varies from the foregoing only in being fitted to slide, instead of swing.

The trough, when used only as a feeding-trough, may be set some little distance away from the coop, for convenience; and when used as a stopper at night, said trough is to be inserted into the opening in the front plate $a$, as seen in red lines, fig. 1; the food, in this case also, being accessible to the chickens while inside of the coop.

This combined feeding-trough and stopper is easily applied or removed, and when in place, will effectually secure the coop against foxes, rats, &c.

What I claim, and desire to secure by Letters Patent, is—

The feeding-trough and stopper, combined with the open-work metallic plate, for closing the opening or openings in the lower part of said plate, for the purposes and substantially as set forth.

In witness whereof, I have hereunto set my signature, this 13th day of June, A. D. 1868.

SAMUEL S. BENT.

Witnesses:
CHAS. H. SMITH,
GEO. T. PINCKNEY.